Oct. 13, 1964

P. V. PALMQUIST ET AL 3,152,950

PROTECTIVE REFLECTIVE FILM

Filed June 3, 1954

— Oriented transparent polyester film.
— Reflective metal coating.
— Vandal-proof adhesive.

Figure 1:
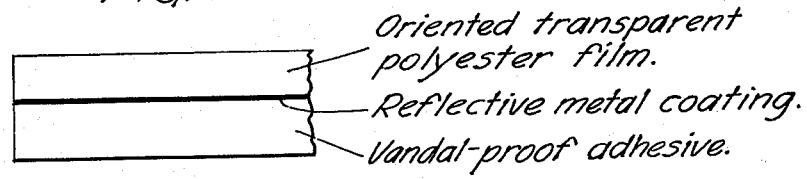

— Protective reflective film of Fig. 1 adhered to metal substrate.
— Metal bumper.

INVENTORS.
PHILIP V. PALMQUIST
JAMES V. ERWIN
BY
Carpenter, Abbott, Coulter, & Kinney
ATTORNEYS

United States Patent Office 3,152,950
Patented Oct. 13, 1964

3,152,950
PROTECTIVE REFLECTIVE FILM
Philip V. Palmquist and James V. Erwin, St. Paul, Minn., assignors to Minnesota Mining and Manufacturing Company, St. Paul, Minn., a corporation of Delaware
Filed June 3, 1954, Ser. No. 434,323
8 Claims. (Cl. 161—214)

This invention relates to metallic-appearing protective film adapted to be adherently attached to metal, wood, glass, fabric and other surfaces as a tough, durable, weather-resistant surface coating having a bright reflective metallic luster. Non-metallic as well as metallic articles may thus be given a brilliantly reflective appearance while being effectively protected from weathering.

A principal object of the invention is the provision of flexible, weather-resistant, brilliantly reflective, adherently attachable film products. The provision of methods for making and applying such film, and of products protectively and decoratively coated therewith, are also to be included among the objects of the invention. Films are provided which when smoothly adhered to various surfaces give the appearance of chrome plating. The films are strong, tough and flexible as well as resistant to the degradative effects of water, organic solvents and oils, sunlight, abrasion, etc. They may be applied over compound curves as well as flat surfaces to form smooth and brilliantly reflective, closely fitting surface layers, and are easily adherently retained in place on the clean surfaces of a wide variety of materials.

In attaining these and other objects and advantages, a self-supporting flexible transparent oriented polyester film (exemplified by "Mylar" film of ¼ to 2 mils thickness) is first coated on one surface with a reflective coating of aluminum, or other inert brilliantly reflective metal, applied by vapor deposition in a high vacuum. The amount of metal applied is just sufficient to provide an opaque and highly reflective coating when viewed through the transparent film. The film is next coated, over the metal coating, with a thin layer of a vandal-proof adhesive composition. The liquid adhesive composition may be coated directly on to the metal-coated surface and then dried. It may alternatively be first coated on a temporary removable carrier web and partially dried, or completely dried and then re-activated by moistening the surface with solvent, and finally transferred to the coated surface of the film under squeeze-roll pressure. The remaining small proportion of solvent is then removed by dispersion through the adhesive coating and by evaporation.

So far as we are aware, it was unknown prior to our invention that thin oriented "Mylar" type films have sufficient weather-resistance to suggest suitability for our purposes. Test samples of our reflective films have been continuously exposed to the weather in Texas for two years and more without losing their brilliant shiny metallic appearance. Texas was selected because of the severe weathering conditions which prevail. Non-oriented "Mylar" films do not have adequate weather-resistance. It is of critical importance that thin films be employed in order to provide sufficient stretch for conformation of the product to curved surfaces, to prevent vandalism, and to provide an appearance of chrome plating. A wide variety of other commercially available films have been tested by us without finding any that was suitable for our purpose. It was a surprising discovery that thin oriented "Mylar" films can be employed.

Methods for the application of metal vapor to the surfaces of sheet materials under high vacuum are well known. The resulting films are highly reflective and appear to be continuous films. However it is found that solvents readily penetrate such metallic layers. The application of solvent-containing adhesive compositions to various prior art metallic coated films has frequently resulted in loss of the initial brilliantly reflective metallic appearance. Presumably the solvent from the adhesive penetrates the porous metal coating and attacks the bond between the metal and the film. In other instances, the adhesive-coated metallized film is reflective when first applied to a surface but soon becomes dull and non-reflective on weathering. For example, it has been found to be extremely difficult, if not impossible, to produce weather-resistant, adhesive-coated, reflective, metallic coatings on films of cellulose acetate, polyacrylates, vinyl films, regenerated cellulose, and drying-oil-modified alkyd resins. The initially bright and reflective metallic surface produced by the vapor coating of such films is rendered dull and non-reflective by the application to the metallic coating of solvent-containing adhesive coating compositions, or by prolonged weathering. Attempts to apply the adhesive layer in other ways have invariably resulted in poor adhesion within the sheet structure, or loss of reflectivity at the metallic surface, or deformation of the polymeric film, or some combination of these or other deleterious effects.

As the flexible transparent film, we employ an oriented polyester film made from the polyester condensation product of terephthalic acid and ethylene glycol, available as "Mylar" polyester film. Analogous films formed of polymeric condensation products of terephthalic acid and other glycols, of isophthalic acid and ethylene glycol or other glycols, and of mixtures of terephthalic and isophthalic acids with ethylene glycols or other glycols or mixtures thereof, are also useful. The thin film must be rapidly quenched and is then oriented, preferably in both lengthwise and crosswise directions, by cold stretching to or almost to the yield point. The resulting film has exceptionally high tensile strength. It is tough, and resists bending and folding. The chemical resistance of the film is high, and it is weather-resistant and waterproof.

The metal vapor coating is applied to the film in a vacuum chamber operating at pressures in the neighborhood of three microns of mercury, or preferably at not more than one micron, depending somewhat on the specific metal being applied. The film is usually held in contact with a cooling plate during the deposition of the metal, in order to prevent overheating due to radiation from the crucible in which the metal is volatilized. Due to its ease of application and due to the superior results obtained, aluminum is a preferred metal, but other metals, e.g., gold, may also be employed. Aluminum produces an appearance which is very similar to that of chrome plating, when viewed through the "Mylar" film on which the metal is deposited.

Aluminum in particular is found to obtain extremely high adhesion to the surface of the oriented polyester film, and to provide a surface to which the subsequently applied adhesive layer forms a firm bond. This is surprising in view of the well-known inert nature of the surface of "Mylar" film. For example, enamels and inks applied to such surfaces are not firmly held, showing a tendency to loosen and fall away when the printed film is exposed to outdoor weathering.

The preferred adhesive composition of this invention consists of a blend of rubbery butadiene-acrylonitrile polymer, a heat-advancing phenol-formaldehyde resin compatible therewith, and various additional modifiers as desired. The adhesive is applied as a liquid in a volatile organic vehicle, which is then removed by evaporation to leave a flexible and durable, hard and non-tacky adhesive layer, which may subsequently be re-activated by heating or by application of solvent. Such an adhesive has extremely high bonding qualities with respect to metal, wood, glass and other surfaces, and is capable of retaining the composite film on such surfaces against severe weathering and against vandalism. The dry adhesive film is adequately extensible so that it is capable of conforming to compound surfaces to which the product may be applied. However the adhesive is not soft and tacky, but is essentially completely non-tacky in the dry state, so that the coated film product may be wound up in roll form or laid up in stacks and subsequently removed therefrom without blocking.

Somewhat softer adhesives containing a plasticizer in amount which renders them slightly tacky and capable of forming a strong vandal-proof bond to metal surfaces when pressed thereagainst, without having been activated by a volatile solvent, may be employed. However it is found that conventional pressure-sensitive tape adhesives, which are normally tacky and pressure-sensitive at room temperature, do not provide a vandal-proof structure and, in fact, permit the protective film to coil away from the surface to which applied under the influence of prolonged normal weathering.

A specific but non-limiting example of a product produced in accordance with the present invention will now be given. The carrier web consisted of a kraft paper provided on both surfaces with a thin but smooth continuous layer of polyethylene. It was coated on one side with a liquid adhesive composition in a thickness sufficient to provide a final dried film of about 1¼ mils. The composition of the adhesive was as follows:

| | |
|---|---|
| Rubbery butadiene-acrylonitrile polymer | 100 |
| Zinc oxide | 10 |
| Glycerol ester of gasoline-insoluble pine wood resin | 40 |
| Heat-advancing phenol-formaldehyde resin compatible with the rubbery polymer | 40 |
| Salicylic acid | 7.5 |
| Dibutyl phthalate | 3.9 |
| Methylethyl ketone | 400 |

Oriented "Mylar" polyester film as hereinbefore described, and having a thickness of one mil, was vapor coated under vacuum with the minimum amount of aluminum required to produce a visibly opaque metallic layer. The surface of the aluminum, when viewed through the transparent film, had the appearance of chrome plating, i.e., was brilliantly reflective.

The exposed surface of the dry adhesive film on the carrier web was activated with a minimum application of methylethyl ketone and was then pressed against the metallized surface of the "Mylar" film under squeeze roll pressure. The carrier web could then be readily stripped away, leaving the adhesive coating firmly bonded to the metallized film. The appearance of the film, viewed from the face, or non-adhesive side, remained unchanged.

The product was wound up into roll form for storage and shipping. Portions were removed from the roll, the carrier web was stripped away, the exposed adhesive surface was activated with a minimum application of solvent, and the film was applied over a metal article having compound curves, e.g. an automobile bumper. Sufficient tension was applied to cause the film to fit smoothly over the entire curved surface, and the film was pressed into place. The adhesive bonded firmly to the clean metal, and the bond gradually improved until after about 24 hours at room temperature it was impossible to strip any significant area of the film from the metal; i.e., the installation was "vandal-proof." The metallic surface, viewed through the transparent outer film, remained brilliantly reflective despite the temporary presence of the adhesive-activating solvent and despite the considerable stretch imparted to the film. The amount of stretch required to provide smooth coverage on the multi-curved surface was such that it would have been impossible to apply a thin aluminum foil in the same manner without tearing or wrinkling the film. The combination had the appearance of chrome-plated steel, and this appearance was maintained after prolonged weathering. The transparent "Mylar" film added an illusion of depth to the appearance of the metallic film. The film effectively protected the shiny metal surface from the elements.

Figure 2:
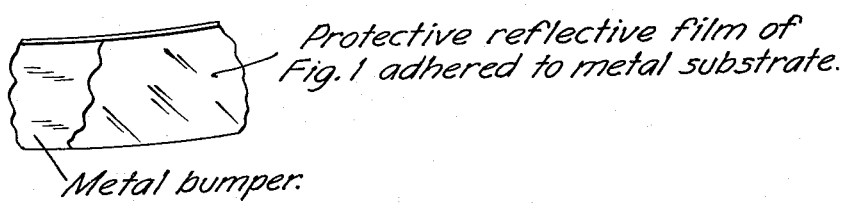

In the accompanying drawing, FIGURE 1 illustrates in cross-section a protective reflective film produced in accordance with the principles of this invention and consisting of a highly oriented transparent ethylene glycol terephthalate polyester film having on one surface thereof a vapor deposited reflective metal coating and, over the metal coating, a further layer of a vandal-proof adhesive; and FIGURE 2 illustrates in elevation a section of a metal substrate, in this case an automobile bumper, having permanently and smoothly bonded to the surface thereof a protective reflective film product as illustrated in FIGURE 1.

What is claimed is as follows:

1. A protective and decorative metallic film product adapted to be firmly adhered to clean metal and other surfaces, comprising a self-supporting highly oriented transparent film having a thickness not exceeding 2 mils and composed of a polyester condensation product of monomers including terephthalic acid and ethylene glycol, a brilliantly reflective inert metal coating applied to one surface of said film by vapor deposition in a vacuum, and a thin vandal-proof adhesive coating, suitable for permanently and smoothly bonding said film product to solid surfaces, bonded to said metal coating.

2. A protective and decorative metallic film product adapted to be firmly adhered to clean metal and other surfaces, comprising: a self-supporting transparent thin film which has been oriented by cold stretching almost to the yield point and formed of a polyester condensation product of monomers including terephthalic acid and ethylene glycol, said film being hand-stretchable and conformable to compound curves and having a thickness not exceeding two mils; a brilliantly reflective aluminum coating applied to one surface of said film by vapor deposition in a vacuum; and a thin vandal-proof adhesive coating, suitable for permanently and smoothly bonding said film product to solid surfaces, bonded to said metal coating and comprising a rubbery butadiene-acrylonitrile polymer, a heat-advancing phenol-formaldehyde resin compatible therewith, and additional compatible plasticizers and tackifiers.

3. An article having a surface to which has been firmly bonded a protective and decorative film product as defined in claim 1, the vandal-proof adhesive coating providing a bond between film and surface which is sufficient to prevent stripping of any significant area of said film from said surface.

4. An article having a surface to which has been firmly bonded a protective and decorative film product as defined in claim 2, the vandal-proof adhesive coating providing a bond between film and surface which is sufficient to prevent stripping of any significant area of said film from said surface.

5. The method of making a protective and decorative film product adapted to be solvent-activated and firmly adhered to clean metal and other surfaces, comprising coating a smooth surface of a transparent film which has been oriented by cold stretching almost to the yield point and which is formed of a polyester condensation product of monomers including terephthalic acid and ethylene glycol with metal applied by vapor deposition in a vacuum to a thickness just sufficient to provide an opaque brilliantly reflective metal layer, and thereover adhering a solvent-containing layer of a vandal-proof adhesive composition suitable for permanently and smoothly bonding said film product to a solid surface, and evaporating the solvent.

6. A protective and decorative metallic film product adapted to be firmly adhered to clean metal and other surfaces, comprising a thin self-supporting flexible highly oriented transparent film composed of a linear polymeric polyester condensation product of monomers including terephthalic acid and ethylene glycol, a brilliantly reflective inert metal coating applied to one surface of said film by vapor deposition in a vacuum, said coating in the decorative film product being clearly visible and specularly reflective through said transparent film, and a thin vandal-proof adhesive coating, suitable for permanently and smoothly bonding said film product to solid surfaces, bonded to said metal coating; said film product being removably lightly bonded by said adhesive coating to a temporary carrier web.

7. An article having a surface protected with and decorated by a metallic film product, comprising a thin self-supporting flexible highly oriented transparent film composed of a linear polymeric polyester condensation product of monomers including a terephthalic acid and ethylene glycol, a brilliantly reflective inert metal coating applied to one surface of said film by vapor deposition in a vacuum, said coating in the decorative film product being clearly visible and specularly reflective through said transparent film, and a thin vandal-proof adhesive coating bonded to said metal coating, said adhesive coating permanently and smoothly bonding said film product to said surface.

8. A protective and decorative metallic film product adapted to be firmly adhered to clean metal and other surfaces, comprising a thin self-supporting flexible highly oriented transparent film composed of a linear polymeric polyester condensation product of monomers including terephthalic acid and ethylene glycol, a brilliantly reflective inert metal coating applied to one surface of said film by vapor deposition in a vacuum, said coating in the decorative film product being clearly visible and specularly reflective through said transparent film, and a thin vandal-proof adhesive coating, suitable for permanently and smoothly bonding said film product to solid surfaces, bonded to said metal coating.

References Cited by the Examiner
UNITED STATES PATENTS

| | | | |
|---|---|---|---|
| 2,017,367 | 10/35 | Kurz | 154—129 |
| 2,039,372 | 5/36 | Wickman | 161—162 |
| 2,383,884 | 8/45 | Palmquist | 54—53.5 X |
| 2,453,258 | 11/48 | Pearson. | |
| 2,459,739 | 1/49 | Groten et al. | |
| 2,581,926 | 1/52 | Groten et al. | |
| 2,650,213 | 8/53 | Hofrichter. | |
| 2,654,684 | 10/53 | Heikin | 154—53.5 XR |
| 2,680,695 | 6/54 | Judd | 117—35 |
| 2,703,772 | 3/55 | Keithly. | |
| 2,714,569 | 8/55 | Prindle et al. | 154—130 |
| 2,740,732 | 4/56 | Peck et al. | |
| 2,774,421 | 12/56 | Lion | 161—220 |

FOREIGN PATENTS 720,870   4/42   Germany.

OTHER REFERENCES

"Metal Coated Plastics Combine Advantages of Both Materials," Material and Methods, pp. 79–82, June 1948.

"Metallizing by High Vacuum Modern Plastics," pp. 135–140, April 1950.

"The Future of Mylar," Modern Plastics, pp. 226–7, November 1952.

EARL M. BERGERT, *Primary Examiner.*

CARL F. KRAFFT, REUBEN LEIBOVITZ, JAMES S. BAILEY, *Examiners.*